(12) United States Patent
Hatta et al.

(10) Patent No.: US 7,510,799 B2
(45) Date of Patent: Mar. 31, 2009

(54) NON-AQUEOUS ELECTROLYTE BATTERY

(75) Inventors: Kazuhito Hatta, Miyaga (JP);
Tsuyonobu Hatazawa, Miyagi (JP);
Tomitaro Hara, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/831,088

(22) Filed: Apr. 23, 2004

(65) Prior Publication Data

US 2004/0197646 A1    Oct. 7, 2004

Related U.S. Application Data

(63) Continuation of application No. 09/582,752, filed as application No. PCT/JP99/06055 on Oct. 29, 1999, now Pat. No. 6,797,430.

(30) Foreign Application Priority Data

Oct. 30, 1998    (JP) ............................... 10-311482

(51) Int. Cl.
*H01M 2/08*    (2006.01)
*H01M 2/30*    (2006.01)

(52) U.S. Cl. .................. 429/181; 429/162; 429/163; 429/176; 429/179; 429/184

(58) Field of Classification Search .............. 429/162, 429/231.1, 178, 175, 176, 163, 181, 179
See application file for complete search history.

(56) References Cited

U.S. PATENT DOCUMENTS

| | | | | | |
|---|---|---|---|---|---|
| 4,664,994 | A | * | 5/1987 | Koike et al. | 429/163 |
| 6,001,505 | A | * | 12/1999 | Fukuda et al. | 429/176 |
| 6,004,693 | A | * | 12/1999 | Fukuda et al. | 429/176 |

FOREIGN PATENT DOCUMENTS

| | | |
|---|---|---|
| EP | 0852404 | 7/1998 |
| JP | 9-288998 | 7/1998 |
| JP | 11-86842 | 3/1999 |
| JP | 11-97070 | 4/1999 |
| JP | 11-312514 | 8/1999 |

* cited by examiner

*Primary Examiner*—John S Maples
(74) *Attorney, Agent, or Firm*—Sonnenschein Nath & Rosenthal LLP

(57) ABSTRACT

A nonaqueous electrolyte battery that includes a unit cell and a battery case that encloses the unit cell. The battery case includes a laminate film that encloses the unit cells by heat welding at least a portion of the laminate film. Upon heat welding, the unit cell further includes a number of electrode terminal leads in which a portion of the electrical terminal leads extend from the battery case. A sealant layer is further applied to at least a portion of the electrode terminal leads so as to contact the battery case upon heat welding in order to further seal the case and to further prevent short circuiting of the nonaqueous-electrolyte battery.

31 Claims, 5 Drawing Sheets

NON-AQUEOUS ELECTROLYTE BATTERY

CROSS REFERENCE TO RELATED APPLICATIONS

This is a continuation of U.S. application Ser. No. 09/582,752 filed on Dec. 26, 2000, now U.S. Pat. No. 6,797,430 issued Sep. 28, 2004. which is a 371 of International Application No. PCT/JP99/06055, filed Oct. 29, 1999, which claims priority from Japanese Application No. 10-311482, filed Oct. 30, 1998. Applicant claims priority to and the benefit of the above-identified applications, the disclosures of which are expressly incorporated herein by reference to the extent permitted by law.

BACKGROUND OF THE INVENTION

The present invention relates to a nonaqueous electrolyte battery incorporating a case constituted by a laminate film and accommodating a battery device, and more particularly to an improvement in the portions in each of which an electrode terminal lead and the case are welded to each other with heat.

In recent years, a multiplicity of portable electronic apparatuses, such as camcoders, portable telephones and portable computers have made their appearance in recent years. The size and weight of the electronic apparatuses have been required to be reduced. As a portable power source for the above-mentioned electronic apparatuses, research and development of batteries, secondary batteries and nonaqueous electrolyte secondary batteries (so-called lithium-ion batteries) have energetically been performed to realize a thin and foldable structure.

Research and development of solidified electrolytic solution have energetically been performed to serve as the electrolyte of the above-mentioned shape-variable battery. In particular, a gel electrolyte which is a solid electrolyte containing a plasticizer and a polymer-type solid electrolyte having a structure that lithium salt is dissolved in polymers have received attention.

To use the merit of the foregoing battery that the thin and light weight structure can be realized, a variety of batteries have been studied which are structured such that a plastic film or a so-called laminate film obtained by bonding a plastic film and a metal member is used to seal the battery device. One of important requirements of the foregoing battery is to realize reliability of hermetic sealing as well as or better than that of the metal can.

For example, a battery disclosed in Japanese Patent Laid-Open No. 56-71278 incorporates a case constituted by a plastic film made of only resin. In the foregoing case, there arises a problem in that the moisture content which has penetrated the resin is introduced into the structure. Moreover, the electrolytic solution penetrates the resin and volatilizes. Therefore, the plastic film constituted by only the resin is not suitable for a battery incorporating a solid electrolyte which contains organic solvent.

To overcome the foregoing problem, it is effective to employ an aluminum laminate pack incorporating metal foil as the film for forming the case. In the foregoing case, short circuit must be prevented. For example, an elongated electrode terminal is taken from the interface of the case which is welded with heat. At this time, contact occurs between the end surface of the metal film of the case which is exposed to the outside over the opening for taking the electrode terminal and the electrode terminal. Also contact occurs between the surface of the metal film exposed to the outside owing to flow of the resin occurring when heat welding has been performed at an excessively high temperature or the pressure and the electrode terminal. Thus, short circuit occurs.

Therefore, for example, an attempt has been disclosed in Japanese Patent Laid-Open No. 9-288998 in which the electrode terminal is taken from the sheet-shape battery pack such that a lead wire coated with polyolefin denatured with maleic acid is employed. Moreover, also the resin for sealing the pack is the polyolefin denatured with maleic acid. Thus, an attempt to improve the adhesive properties is made.

The structure in which the portion of the lead which is welded to the case film with heat is coated with the sealant resin similar to the material of the film so as to improve the adhesivity. However, the apprehension that the sealant resin can be broken owing to heat and pressure cannot be eliminated. A method for preventing short circuit occurring owing to the breakage of the film may be employed with which the process is performed (the heat welding process) at a lower temperature. In the foregoing case, insufficiently low pressure causes a defect to take place with which prevention of burrs formed owing to cutting of the leads cannot be prevented and sealing of the leads along the two side ends cannot be performed. In case of the foregoing defect takes place, the airtightness of the sheet-shape battery pack greatly deteriorates.

As described above, a heat welding method which is capable of realizing both of satisfactory sealing characteristic and resistance against short circuit has not been realized as yet. Therefore, the foregoing method must be developed.

BRIEF SUMMARY OF THE INVENTION

An object of the present invention is to provide a nonaqueous electrolyte battery which is capable of improving a sealing characteristic and preventing short circuit even if the heat or the pressure is high and exhibiting a long lifetime against charge/discharge cycles, safety and productivity.

To achieve the foregoing object, according to one aspect of the present invention, there is provided a nonaqueous electrolyte battery comprising: a case constituted by a laminate film and accommodating a unit cell such that the unit cell is sealed by heat welding; and electrode terminal leads electrically connected to electrodes which constitute the unit cell and sandwiched by a heat weld portion so as to be exposed to the outside of the case, wherein the electrode terminal leads are coated with sealant resin at a position corresponding to the heat weld portion, and at least a portion of the sealant resin which is in contact with either principal plane of each of the electrode terminal leads is deformed along the shape of each of the electrode terminal leads so that at least the portion of the sealant resin is formed into an uneven shape.

According to another aspect of the present invention, there is provided a method of manufacturing a nonaqueous electrolyte battery such that a unit cell is accommodated in a case constituted by a laminate film, electrode terminal leads electrically connected to electrodes constituting the unit cell are exposed to the outside of the case, the outer surface of the case is welded with heat and the unit cell is sealed in the case, the method of manufacturing a nonaqueous electrolyte battery comprising the steps of: placing sealant resin in portions in which the electrode terminal leads correspond to a heat weld portion; and causing a heater head having an elastic member provided for at least either surface thereof which is in contact with the sealant resin to sandwich the electrode terminal leads to weld the electrode terminal leads with heat.

According to another aspect of the present invention, there is provided a heat welding apparatus comprising: a pair of heater heads for sandwiching electrode terminal leads on which sealant resin is placed at positions corresponding to a heat weld portion of a case, wherein at least either of the heater heads has an elastic member provided for the surface which is in contact with the sealant resin.

The elastic member on the surface of the heater head causes pressure to efficiently be applied to also portions along the two side ends of the electrode terminal leads. Thus, formation of a tunnel shape space which can easily be formed on each of the two side ends of the electrode terminal leads can be prevented by introducing resin.

Therefore, provision of the elastic member for the heater head when the sealant resin is welded to the electrode terminal leads with heat enables a necessity for applying a high pressure to the weld surface to be eliminated.

The electrode terminal leads are obtained as described above. Therefore, the elastic members are deformed along the shape of the hard electrode terminal leads made of metal. It leads to a fact that also the sealant resin is deformed along the shapes of the electrode terminal leads.

As a result, the electrode terminal leads do not considerably engage in the sealant resin. When burrs are formed on the electrode terminal lead, the burrs do not penetrate the sealant resin. Thus, short circuit can be prevented.

The effect of the elastic member to introduce the resin enables a defect of a type obstructing sealing to be prevented.

A heater head of a type which is not provided with the elastic member causes the two sides of the sealant resin to be flattened. Therefore, the electrode terminal leads are greatly engaged in the sealant resin. Hence it follows that the electrode terminal lead having a burr easily penetrates the sealant resin. Thus, short circuit occurs. When the pressure and the temperature at which the heat welding is performed are lowered to prevent occurrence of the short circuit, the adhesive properties of the heat weld portion deteriorates. What is worse, a defect of a type which obstructs sealing occurs. Hence it follows that the sealing characteristics excessively deteriorate.

DETAILED DESCRIPTION OF THE INVENTION

The structure of a nonaqueous electrolyte battery according to the present invention will now be described with reference to the drawings.

Figure 1:
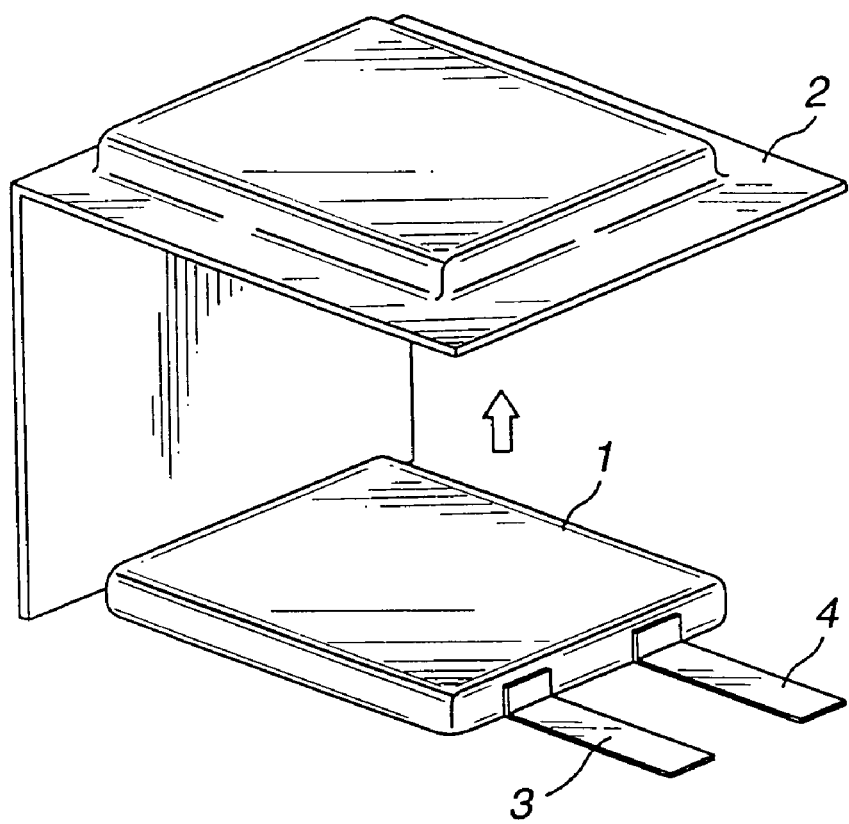
FIG. 1 is an exploded perspective view showing an example of a nonaqueous electrolyte battery according to the present invention.
Figure 2:
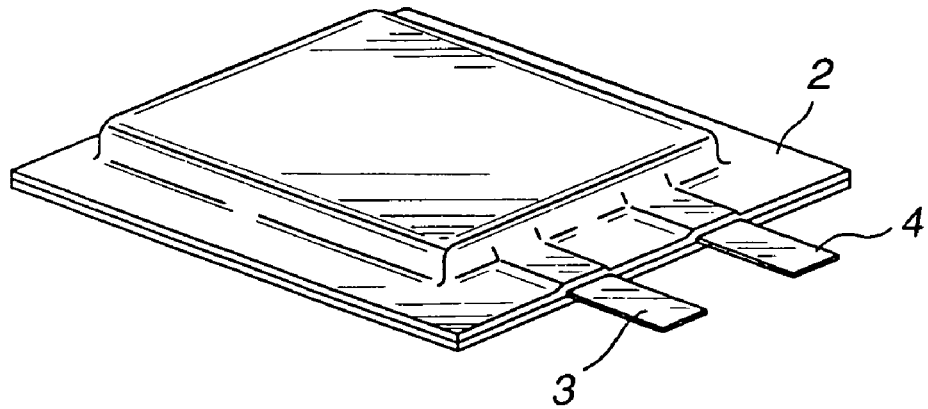
FIG. 2 is a schematic perspective view showing the example of the nonaqueous electrolyte battery according to the present invention.

The nonaqueous electrolyte battery according to the present invention is, for example, a solid-electrolyte battery or a gel electrolyte battery. As shown in FIGS. 1 and 2, a unit cell 1 has a structure that a solid electrolyte or a gel electrolyte is sandwiched between a positive-electrode active material layer and a negative-electrode active material layer. The unit cell 1 is accommodated in a case 2 constituted by a laminate film. Then, the peripheral portion of the laminate film is welded with heat so that the unit cell 1 is sealed in the case 2.

The unit cell 1 incorporates a negative-electrode terminal lead 3, which is electrically connected to a negative electrode which constitutes the unit cell 1, and a positive-electrode terminal lead 4 which is electrically connected to a positive electrode. The negative-electrode terminal lead 3 and the positive-electrode terminal lead 4 are taken to the outside of the case 2.

The nonaqueous electrolyte battery according to the present invention has the structure that the negative-electrode terminal lead 3 and the positive-electrode terminal lead 4 are sandwiched by the heat weld portion of the case 2 so as to be exposed to the outside of the case 2 when the unit cell 1 is sealed in the case 2. At least portions of the negative-electrode terminal lead 3 and the positive-electrode terminal lead 4 sandwiched by the laminate film and welded with heat are coated with sealant resin. Thus, resistance against penetration of moisture can be maintained and satisfactory adhesive properties with the terminal metal and sufficient adhesive properties with the innermost layer of the laminate film can be obtained.

Figure 3:
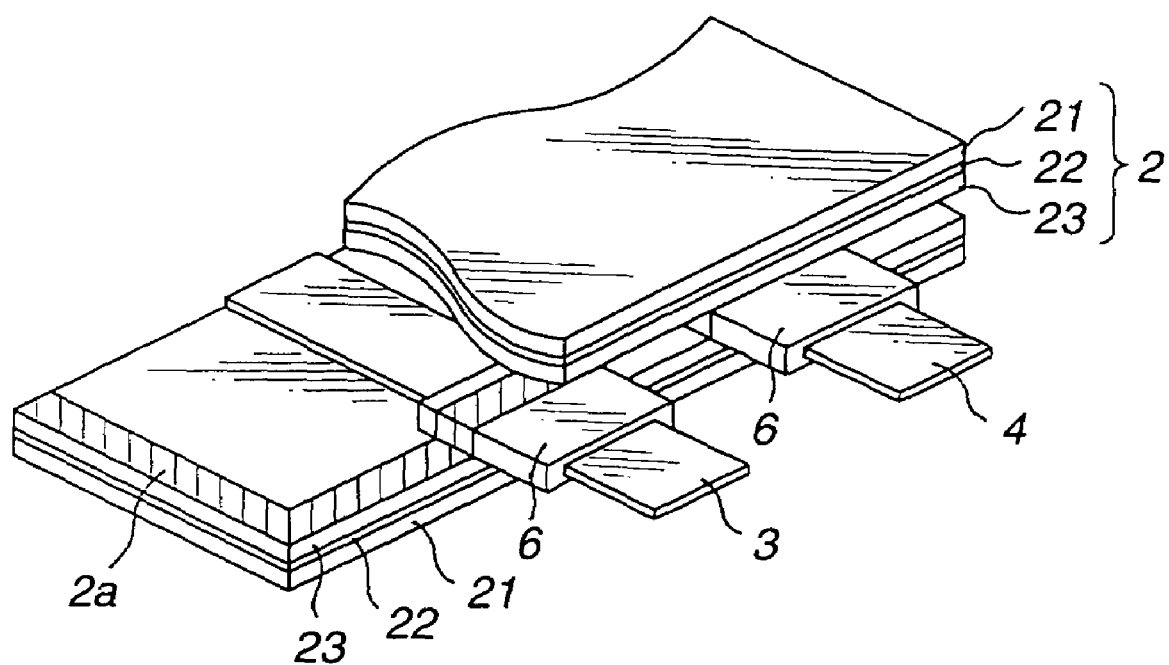
FIG. 3 is a sectional view showing heat weld portion of a case.

The foregoing structure is shown in FIG. 3. The case 2 is constituted by, for example, three layers consisting of a case protecting layer 21, an aluminum layer 22 and a heat weld layer (the innermost layer of the laminate film) 23. When the outer periphery of the case 2 is welded with heat, sealing is performed. Therefore, the periphery of the case 2 is formed into a heat weld portion 2a having a predetermined width. Thus, the heat weld layers 23 in the foregoing portion are welded to each other with heat.

As a result, the negative-electrode terminal lead 3 and the positive-electrode terminal lead 4 traverse the heat weld portion 2a so as to be taken to the outside of the case 2.

In the present invention, the portions of the negative-electrode terminal lead 3 and the positive-electrode terminal lead 4 corresponding to the heat weld portion 2a are coated with sealant resin 6.

Figure 4:
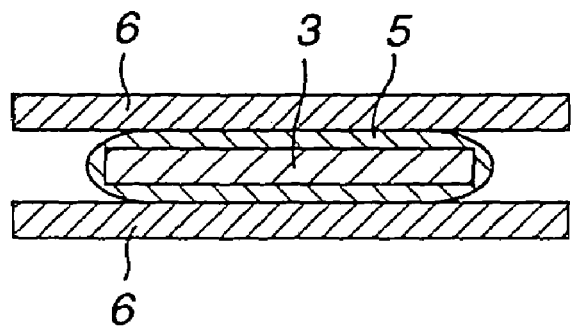
FIG. 4 is a schematic cross sectional view showing an example of the structure of sealant resin for a negative-electrode terminal lead.

FIG. 4 shows a coating structure for the negative-electrode terminal lead 3 which is taken as an example. The negative-electrode terminal lead 3 is first coated with a undercoat layer 5 (which may be omitted). Then, the outer surface of the negative-electrode terminal lead 3 is coated with the sealant resin 6.

The sealant resin 6 is composed of upper and lower resin layers 61 and 62. The negative-electrode terminal lead 3 is sandwiched between the two resin layers 61 and 62 so as to be welded to each other with heat.

Figure 5:
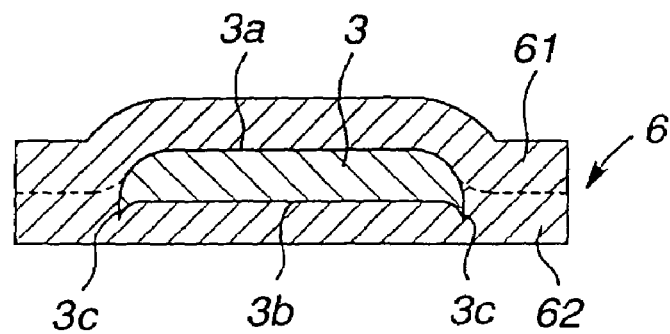
FIG. 5 is a schematic cross sectional view showing a state where the electrode terminal lead is coated with the sealant resin.

The resin layer 61 is in contact with either principal plane 3a of the negative-electrode terminal lead 3, while the resin layer 62 is in contact with another principal plane 3b of the negative-electrode terminal lead 3. At least the resin layer 61 which is in contact with the principal plane 3a is, as shown in FIG. 5, deformed along the shape of the negative-electrode terminal lead 3. When the surface of the resin layer 61 is formed into an uneven shape on which the shape of the negative-electrode terminal lead 3 is reflected.

Since the foregoing state of coating is realized, engagement the negative-electrode terminal lead 3 in the sealant resin 6 can be prevented. When burrs 3c are formed on the negative-electrode terminal lead 3, the burrs 3c do not penetrate the sealant resin 6 (in particular, the resin layer 62). Thus, short circuit can be prevented.

The sealant resin 6 is sufficiently introduced into the portion around the burrs and the portions along the two sides ends of the negative-electrode terminal lead 3. As a result, occurrence of a defect which obstructs sealing can be prevented. Hence it follows that a satisfactory sealing characteristic can be maintained.

To realize the foregoing state of coating, a heat welding apparatus provided with an elastic member is employed.

Figure 6:
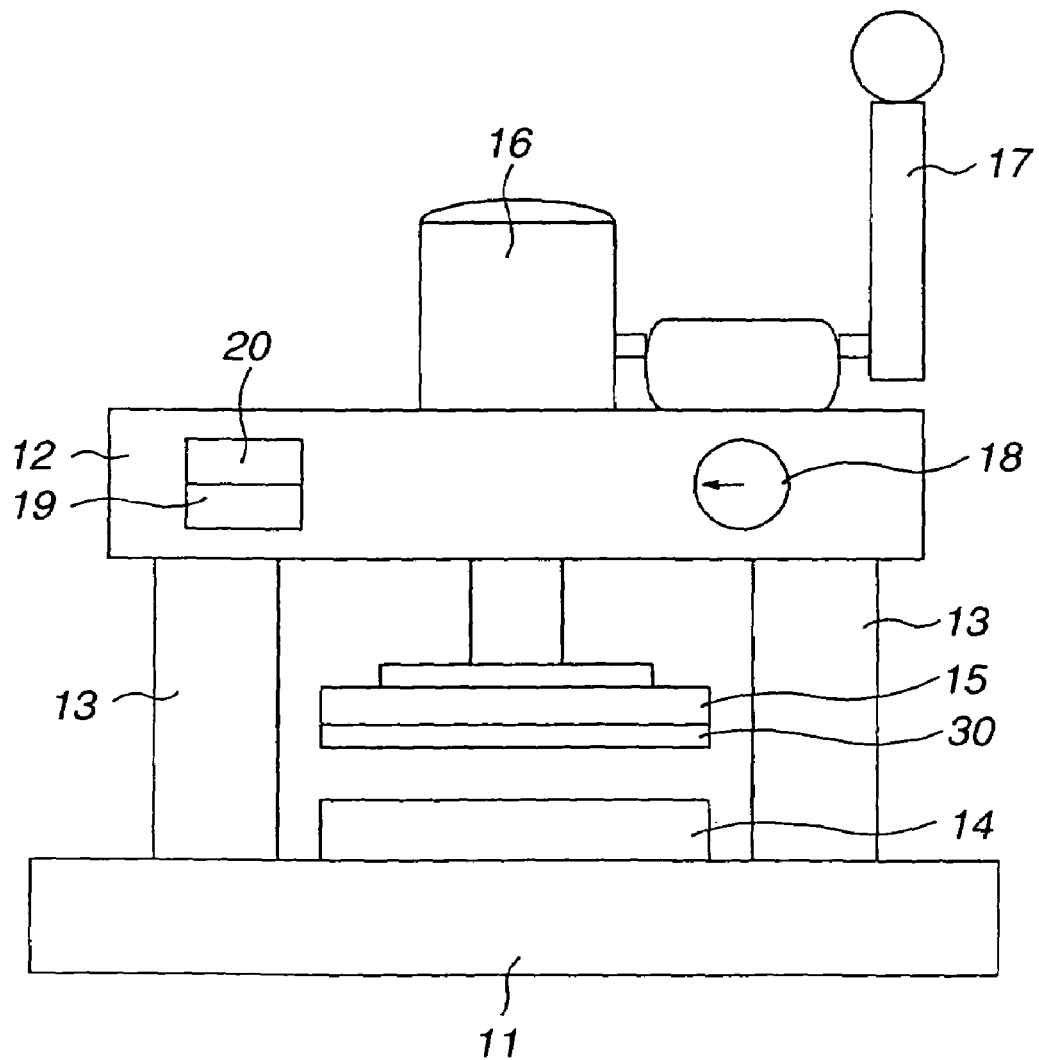
FIG. 6 is a front view schematically showing an example of a heat welding apparatus.

FIG. 6 shows an example of a heat welding apparatus for use to coat the electrode terminal leads with the sealant resin.

The heat welding apparatus incorporates a pair of upper and lower heater-head support boards 11 and 12 which are supported by support columns 13 so that the heater-head support boards 11 and 12 are disposed apart from each other for a predetermined distance.

The heater-head support board 11 serves as a support frame for the apparatus. The heater head 14 is secured to the heater-head support board 11.

The other heater-head support board 12 supports the other heater head 15 such that vertical movement of the heater head 15 is permitted. When the heater head 15 is moved downwards, an article which must be welded is sandwiched between the heater heads 14 and 15.

A pump 16 for applying pressure to the heater head 15 is disposed on the heater-head support board 12. The pump 16 incorporates a pressure-regulating handle 17 for adjusting the pressure which must be applied. Thus, the pressure which is applied to the article which must be welded can be adjusted.

The heater-head support board 12 is provided with a pressure meter 18 for indicating the applied pressure, a lower-heater temperature control panel 19 and an upper-heater temperature control panel 20.

The heat welding apparatus has the foregoing basic structure. In the present invention, an elastic member 30 is provided for the surface of at least either heater head (which is the heater head 15 in this embodiment) which is disposed opposite to the article which must be welded. Thus, satisfactory heat welding can be performed.

It is preferable that the elastic member 30 is made of a material having a melting point which is not lower than 100° C. For example, silicon rubber, polytetrafluoroethylene, polyurethane, polyimide, polyamide or polyester may be employed.

It is preferable that the thickness of the elastic member 30 is not smaller than 10 μm nor larger than 2 cm. When the elastic member has a thickness (about 0.1 mm or larger) not smaller than that of the electrode terminal leads, a satisfactory effect can be obtained from the elastic member 30.

The elastic member 30 on the surface of the heater head 15 is able to efficiently conduct the pressure to as well as the two side ends of each electrode terminal lead. Thus, an effect can be obtained in that the resin is introduced to prevent formation of a tunnel-shape space which can easily be formed in the foregoing portions and which obstructs the sealing characteristics. When the elastic member 30 is not provided, a high pressure must be applied to the surface which must be welded in order to apply pressure to the portions along the two side ends of each of the electrode terminal leads. Therefore, inevitable burrs of the electrode terminal lead are sometimes exposed to the outside, the burrs being brought into contact with the metal film of the film of the case. Thus, short circuit occurs.

Figure 7:
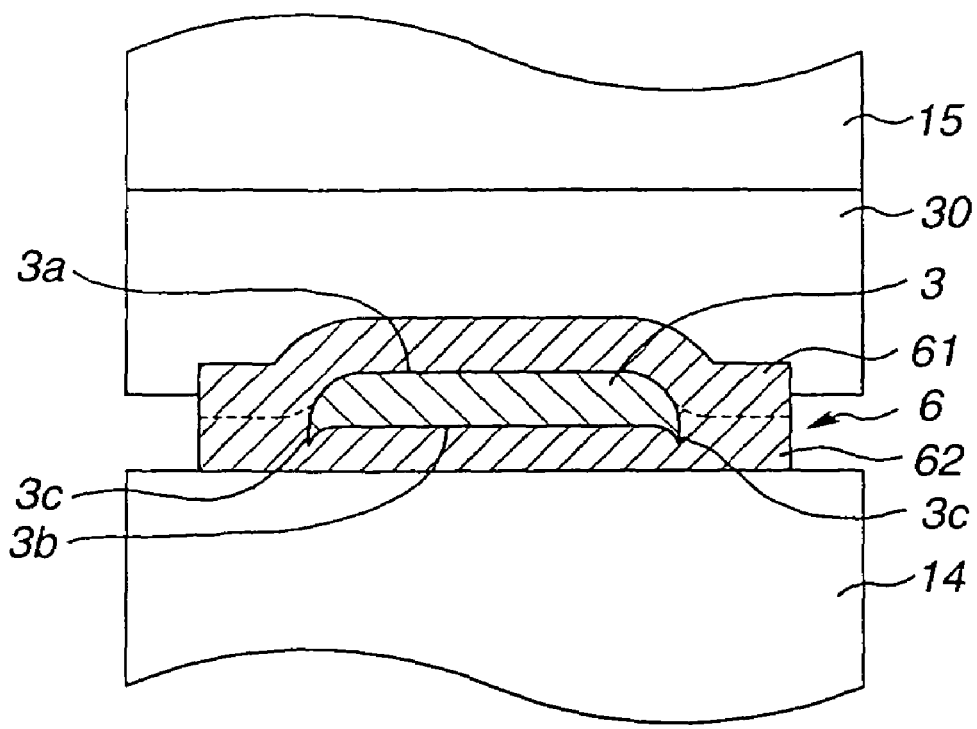
FIG. 7 is a schematic cross sectional view showing a state where the sealant resin is pressed by heater heads.

FIG. 7 shows a state where the pressure is applied to the sealant resin 6 from the heater heads 14 and 15 provided for the elastic member 30.

The resin layers 61 and 62 for constituting the sealant resin 6 are disposed on the two sides of the negative-electrode terminal lead 3. Then, the negative-electrode terminal lead 3 having the resin layers 61 and 62 are sandwiched by the heater heads 14 and 15 so as to be pressurized and heated. Thus, the elastic member 30 is deformed along the shape of the negative-electrode terminal lead 3. It leads to a fact that also the resin layer 61 is deformed. As a result, the resin layer 61 is deformed along the shape of the negative-electrode terminal lead 3 after heat welding has been performed. Therefore, a shape on which the shape of the negative-electrode terminal lead 3 is reflected is realized.

Since the elastic member 30 is provided for the surface of the heater head 15 as described above, application of excessive pressure to the negative-electrode terminal lead 3 can be prevented. As a result, the problem of the breakage of the film caused by the burrs 3c can be prevented.

The sealant resin 6 can sufficiently be introduced into the portions along the burrs 3c and the two side ends of the negative-electrode terminal lead 3. As a result, deterioration of the sealing characteristic can be prevented.

The foregoing heat welding apparatus provided with the elastic member may be applied to weld the periphery of the case with heat as well as weld the sealant resin to the electrode terminal leads with heat.

The sealant resin 6 will now be described.

Basically, the sealant resin 6 may be formed into a single resin layer. For example, heat fusible resin may be employed with is exemplified by polyolefin, ethylene-acrylate copolymer, ethylene-methacrylate copolymer, ionomer resin and carboxylic resin.

Specifically, any one of olefin resin having a marketed moisture-proof grade may be employed which is exemplified by polyethylene, polypropylene and denatured polyethylene. The surface of the sealant resin 6 which is bonded to the electrode terminal lead may be applied with polyolefin resin for bonding metal which is represented by "BONDYNE" manufactured by Sumitomo and "POLYTAC" manufactured by Idemitsu. To realize both satisfactory adhesive property with the electrode terminal lead and excellent welding to the case with heat, it is preferable that acid-denatured polyolefin, such as acid-denatured polypropylene, is employed. Two or more types of the foregoing materials may be mixed.

To prevent occurrence of short circuit even at high pressure or a high temperature, it is effective to provide a strong resin layer having a high melting point for the inside portion of the sealant structure.

Figure 8:
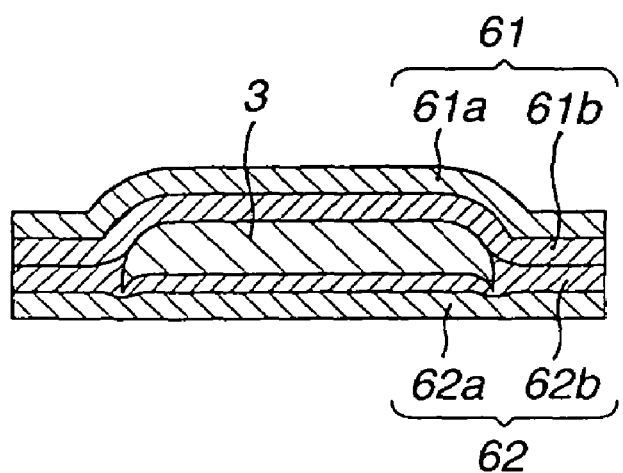
FIG. 8 is a schematic cross sectional view showing a state where the electrode terminal lead is coated with sealant resin having a two-layer structure.

FIG. 8 shows a two-layer sealant structure. The resin layers 61 and 62 are composed of outer layers 61a and 62a which are in contact with the case and inner layers 61b and 62b which are in contact with the negative-electrode terminal lead 3.

When the heat welding process is performed, the surface portion (the outer layers 61a and 62a) of the sealant resin 6 must be melted. Moreover, the resin materials (the inner layers 61b and 62b) which must be combined with each other are required not to be melted and fluidized in any case.

The heat fusible resin for use to form the outer layers 61a and 62a may be the material similar to the foregoing materials employed to form the single layer. From a viewpoint of practical use, polyethylene or polypropylene may be employed.

The resin materials (the inner layers 61b and 62b) which must be combined may be polyethylene terephthalate, polytetrafluoroethylene, aramide resin, polyimide, polyamide or polyester. As an alternative to employment of different materials, resin for example, polypropylene, may be employed such that a copolymer having a low melting point is employed in the heat weld portion. Thus, the surface and the lower layer may be different from each other. In the foregoing case, control of the molecular weight, copolymerization ratio and the molecular structure enables the lower layer to have a high melting viscosity when the melting points are not different from each other. Thus, the shape stability of the resin can be obtained. In the foregoing cases, another advantage can be obtained in that an integrated structure can easily be formed by performing simultaneous extrusion or multilayer coating when the bonding structure is not employed.

A material having a melting point which is higher than that of the material of the surface layer by 20° C. is employed to form the central layer of the resin with which the electrode terminal leads is coated. Moreover, the resin with which the terminal is coated is caused to protrude over the end surface of the heat weld portion. Thus, a battery with which short circuit between terminals can be provided.

When the multilayer structure having two or more layers is employed, sheet-shape resin layers may be laminated to form the multilayer structure. Another method may be employed with which, for example, a heat weld layer (the outermost layer) may be applied to form the multilayer structure. In the latter case, the heat fusible resin is diluted to prepare solution which is applied to the base material of the resin having the high melting point with a brush or a dispenser. Then, the base material is heated and dried.

The quantity of protrusion of the sealant resin 6 over the case 2 will now be described. In consideration of prevention of short circuit caused from the contact with the thin metal film (the aluminum layer 22) constituting the case 2, it is preferable that the length of the protrusion of the sealant resin 6 over the case 2 is longer than the thickness of the case 2. The quantity of protrusion is not limited. When the apparatus is structured such that, for example, the connection with an external circuit is established at the end surface of the terminal lead, the overall surface of the terminal lead may be covered with the sealant resin 6. To easily establish the connection, it is preferable that the terminal lead is exposed to the outside by 0.5 mm or longer.

It is preferable that the thickness of the sealant resin 6 is 10 µm to 500 µm. When the thickness of the sealant resin 6 is too small, a required object cannot sufficiently be obtained. When the thickness is too large, a stepped portion is undesirably formed to perform satisfactory heat welding.

The process for bonding the sealant resin 6 to the electrode terminal lead may be performed as an independent process. The foregoing process may be performed simultaneously with the process for welding the periphery of the case with heat.

Figure 9:
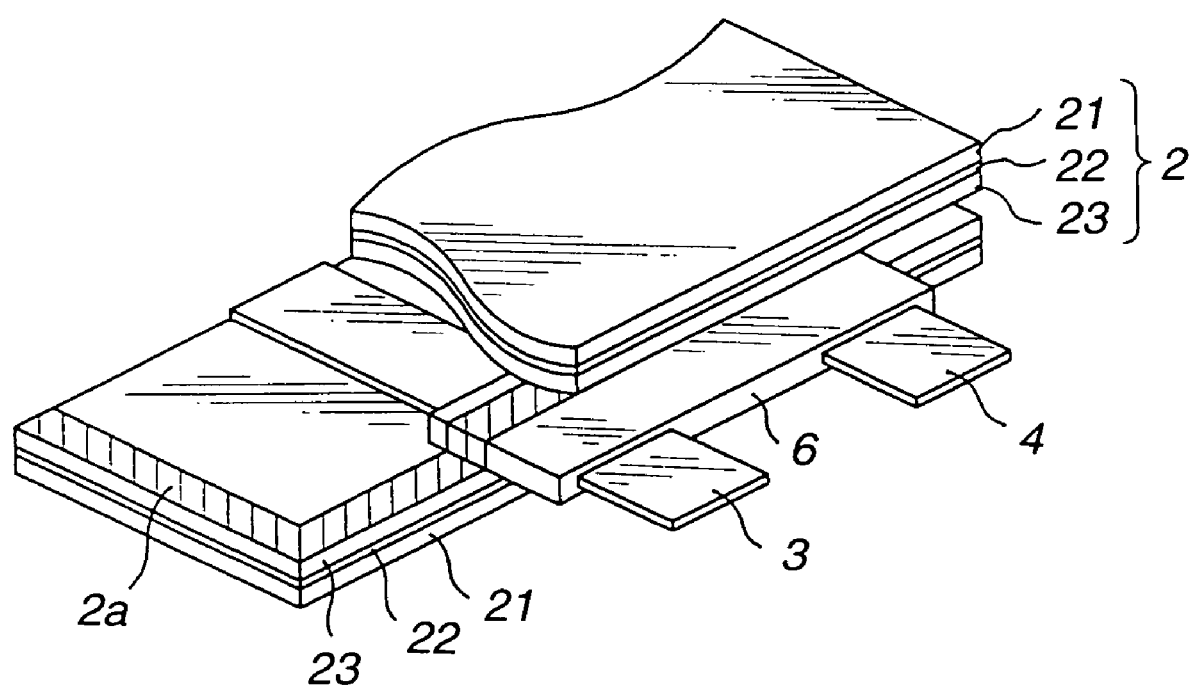
FIG. 9 is a sectional view showing an example of the sealant resin for collectively coating the negative-electrode terminal lead and the positive-electrode terminal lead.

In the example shown in FIG. 3, the sealant resin 6 is individually provided for the terminal leads. As shown in FIG. 9, the plural terminal leads may collectively be covered with the sealant resin 6.

The sealant resin 6 may be formed into one film which is wound around the electrode terminal lead. As an alternative to this, two films may be formed so as to sandwich the electrode terminal lead.

A case will now be considered such that the unit cell 1 is the solid electrolyte battery or the gel electrolyte battery. In the foregoing case, a polymer material for use as the polymer solid electrolyte may be any one of the following materials: silicon gel, acrylic gel, acrylonitrile gel, polyphosphagen denatured polymer, polyethylene oxide, polypropylene oxide, their composite polymers, crosslinked polymers, denatured polymers; fluorine polymers, such as poly(vinylidene fluororide), poly(vinylidene fluororide-co-hexafluoropropylene), poly(vinylidene fluororide-co-tetrafluoroethylene), poly(vinylidene fluororide-co-trifluoroethylene) and their mixture. As a matter of course, the present invention is not limited to the foregoing materials.

The solid electrolyte or the gel electrolyte laminated on the positive-electrode active material layer or the negative-electrode active material layer is prepared by causing the positive-electrode active material layer or the negative-electrode active material layer to be impregnated with solution composed of a polymer compound, electrolyte salt and solvent (moreover, a plasticizer in a case of the gel electrolyte). Then, the solvent is removed, and then the solution is solidified. A portion of the solid electrolyte or the gel electrolyte laminated on the positive-electrode active material layer or the negative-electrode active material layer is a portion with which the positive-electrode active material layer or the negative-electrode active material layer is impregnated. Then, the foregoing portion is solidified. In a case of the crosslinked system, light or heat is then applied to perform crosslinking so that the portion of the foregoing electrolyte is solidified.

The gel electrolyte is composed of a plasticizer containing lithium salt and 2 wt % to 30 wt % matrix polymer. At this time, ester, ether or carbonate may be employed solely or as a component of the plasticizer.

As the matrix polymer for gelling the carbonate when the gel electrolyte is prepared, any one of a variety of polymers for use to constitute the gel electrolyte may be employed. From a viewpoint of realizing stability of oxidation and reduction, it is preferable that a fluorine polymer may be employed which is, for example, poly (vinylidene fluororide) or poly(vinylidene fluororide-co-hexafluoropropylene).

The polymer solid electrolyte is composed of lithium salt and a polymer compound for dissolving the lithium salt. The polymer compound may be an ether polymer, such as poly (ethylene oxide), its crosslinked material or poly(methacrylate) ester or acrylate, a fluorine polymer, such as poly(vinylidene fluororide), poly (vinylidene fluororide-co-hexafluoropropylene). The foregoing material may be employed solely or their mixture may be employed. From a viewpoint of realizing stability of oxidation and reduction, it is preferable that a fluorine polymer may be employed which is, for example, poly(vinylidene fluororide) or poly(vinylidene fluororide-co-hexafluoropropylene).

The lithium salt which is contained in the gel electrolyte or the polymer solid electrolyte may be lithium salt which is used in electrolytic solutions for batteries. The lithium compound (salt) may be any one of the following materials. Note that the present invention is not limited to the following materials.

The lithium compound is exemplified by lithium chloride, lithium bromide, lithium iodide, lithium chlorate, lithium perchlorate, lithium bromate, lithium iodate, lithium nitrate, tetrafluorolithium borate, lithium hexafluorophosphate, lithium acetate, bis(trifluoromethanesulfonyl)imide lithium, $LiAsF_6$, $LiCF_3SO_3$, $LiC(SO_2CF_3)_3$, $LiAlCl_4$ and $LiSiF_6$.

The lithium compound may be employed solely or a mixture of the foregoing lithium compounds may be employed. From a viewpoint of stability of oxidation, it is preferable that $LiPF_6$ or $LiBF_4$ is employed.

The concentration of the lithium salt which must be dissolved in a case of the gel electrolyte may be 0.1 mole to 3.0 moles in the plasticizer. It is preferable that the concentration is 0.5 mol/litter to 2.0 mole/litter.

The battery according to the present invention can be structured similarly to the conventional lithium-ion battery except for use of the gel electrolyte or the solid electrolyte.

That is, the material of the negative electrode for constituting the lithium-ion battery may be a material which permits doping/dedoping of lithium. The material for constituting the negative electrode may be a carbon material, such as non-graphitizable carbon material or graphite material. Specifically, pyrocarbon, cokes (pitch cokes, needle cokes or petroleum cokes), graphite, vitreous carbon, a material obtained by baking an organic polymer (a material obtained by baking phenol resin or furan resin at an appropriate temperature), carbon fibers or active carbon. Another material which permits doping/dedoping of lithium may be a polymer, such as polyacetylene or polypyrrole or an oxide, such as $SnO_2$. When the negative electrode is manufactured from the foregoing material, a known binder or the like may be added.

The positive electrode may be structured by using a metal oxide, a metal sulfide or a specific polymer as the positive-electrode active material to meet the requirement of the battery. When the lithium-ion battery is structured, the positive-electrode active material may be a metal sulfide or an oxide, such as $TiS_2$, $MoS_2$, $NbSe_2$ or $V_2O_5$ which does not contain lithium. As an alternative to this, a lithium composite oxide mainly composed of $Li_xMo_2$ (where M is one or more types of transition metal materials, x varies according to a state of charge/discharge and x is usually not smaller than 0.05 or larger than 1.10). It is preferable that the transition metal M which constitutes the lithium composite oxide is Co, Ni or Mn. The lithium composite oxide is exemplified by $LiCoO_2$, $LiNiO_2$, $LiNi_yCo_{1-y}O_2$ (where 0<y<1) and $LiMn_2O_4$. The lithium composite oxide is an excellent positive-electrode active material which is capable of generating high voltage and realizing excellent energy density. A plurality of the foregoing positive-electrode active materials may be employed in the positive electrode. When the positive electrode is manufactured by using the above-mentioned positive-electrode active material, a known conductor and a binder may be added.

The structure of the unit cell 1 may be a laminate structure constituted by alternately laminating the positive electrode and the negative electrode such that the solid electrolyte is sandwiched; a wound structure constituted by laminating the positive electrode and the negative electrode such that the solid electrolyte is sandwiched and by winding the laminate; and a folded structure constituted by laminating the positive electrode and the negative electrode such that the solid electrolyte is sandwiched and by alternately folding the laminate. Any one of the foregoing structures may arbitrarily be employed.

The present invention may be applied to both of the primary battery and the secondary battery. When the present invention is applied to a nonaqueous electrolyte secondary battery, a satisfactory effect can be obtained.

Examples and comparative examples of the present invention will now be described such that results of experiments are described.

EXAMPLE 1

A sample battery was manufactured and evaluated as follows.

The negative electrode was manufactured as follows.

Ninety parts by weight of graphite powder obtained by pulverization and 10 parts by weight of poly(vinylidene fluororide-co-hexafloropropylene) serving as a binder were mixed so that a negative-electrode mix was prepared. Then, the negative-electrode mix was dispersed in N-methyl-2-pyrrolidone so as to be slurried. The slurry was uniformly applied to either side of an elongated copper foil having a thickness of 10 μm and serving as a collector for the negative electrode. Then, the applied side was dried, and then the structure was compressed and molded by a roll pressing machine. Then, the required portion for forming the negative electrode was cut from the obtained structure.

On the other hand, the positive electrode was manufactured as follows.

To obtain the positive-electrode active material ($LiCoO_2$), lithium carbonate and cobalt carbonate were mixed at a ratio 0.5 mole:1 mole. Then, the mixture was baked at 900° C. in the air for 5 hours. Then, 91 parts by weight of obtained $LiCoO_2$, 6 parts by weight of graphite serving as a conductor and 10 parts by weight of poly (vinylidene fluororide-co-hexafloropropylene) serving as a binder were mixed with one another. Thus, a positive-electrode mix was prepared. The positive-electrode mix was dispersed in N-methyl-2-pyrrolidone so as to be slurried. The slurry was uniformly applied to either side of elongated aluminum foil which was a collector for the positive electrode and having a thickness of 20 μm. Then, the applied side was dried, and then the structure was compressed and molded by a roll pressing machine. Then, a required positive electrode was obtained by cutting the molded structure.

The gel electrolyte was obtained as follows.

The negative electrode and the positive electrode were uniformly coated and impregnated with solution prepared by mixing and dissolving 10 parts by weight of poly(vinylidene fluororide-co-hexafloropropylene) having a weight average molecular weight Mw of 600,000 and 60 parts by weight of dimethyl carbonate in a plasticizer composed of 42.5 parts by weight of ethylene carbonate (EC), 42.5 parts by weight of propylene carbonate (PC) secondary battery 15 parts by weight of $LiPF_6$. Then, the negative and positive electrodes were allowed to stand at room temperature for 8 hours to vaporize and remove dimethyl carbonate. Thus, the gel electrolyte was obtained.

The negative and positive electrodes each of which was coated with the gel electrolyte were placed opposite to each other and applied with pressure so that a flat plate shape gel electrolyte battery was manufactured which had an area of 2.5 cm×4.0 cm and a thickness of 0.3 mm.

A positive-electrode terminal lead made of aluminum and a negative-electrode terminal lead made of nickel were welded to the portions (the aluminum foil of the positive electrode and the copper foil of the negative electrode) of the electrode plates each of which was not coated with the active material layer. Then, the unit cell was introduced into a battery container constituted by a laminate film having the inner surface made of polypropylene. Then, the leads were taken from the heat weld portion, and then heat welding was performed by using a sealing machine under conditions that the temperature was 200° C. and duration was 10 seconds such that the width of sealing was 5 mm. Thus, a test battery was manufactured.

The composition of the sealant resin for the electrode terminal leads of each test battery was shown in Table 1 and bonding conditions were shown in Table 2.

TABLE 1

| | Surface Resin of Sealant | Central Material outer surface Sealant | Method of Joining to Central Material of Surface Resin |
|---|---|---|---|
| Test Battery 1 | maleic acid denatured PP | block copolymer maleic acid denatured PP | simultaneous extrusion |
| Test Battery 2 | ethylene-acrylate copolymer | polyethylene terephthalate | adhesive agent |
| Test Battery 3 | ethylene-methacrylate copolymer | polyethylene terephthalate | adhesive agent |
| Test Battery 4 | ionomer resin | polyethylene terephthalate | adhesive agent |
| Test Battery 5 | maleic acid denatured PP | polyethylene terephthalate | adhesive agent |
| Test Battery 6 | maleic acid denatured PP | polyimide | adhesive agent |
| Test Battery 7 | maleic acid denatured PP | polyamide | coating |
| Test Battery 8 | maleic acid denatured PP | polyester | coating |
| Test Battery 9 | maleic acid denatured PP | polyethylene terephthalate | coating |
| Test Battery 10 | maleic acid denatured PP | polyethylene terephthalate | coating |
| Test Battery 11 | maleic acid denatured PP | polyethylene terephthalate | coating |
| Test Battery 12 | maleic acid denatured PP | polyethylene terephthalate | coating |
| Test Battery 13 | maleic acid denatured PP | polyethylene terephthalate | coating |
| Test Battery 14 | maleic acid denatured PP | polyethylene terephthalate | coating |
| Test Battery 15 | maleic acid denatured PP | polyethylene terephthalate | coating |
| Test Battery 16 | maleic acid denatured PP | polyethylene terephthalate | coating |
| Test Battery 17 | maleic acid denatured PP | polyethylene terephthalate | coating |
| Test Battery 18 | maleic acid denatured PP | polyethylene terephthalate | coating |
| Test Battery 19 | maleic acid denatured PP | polyethylene terephthalate | coating |
| Test Battery 20 | maleic acid denatured PP | polyethylene terephthalate | coating |
| Test Battery 21 | maleic acid denatured PP | maleic acid denatured PP | integral molding |
| Test Battery 22 | maleic acid denatured PP | maleic acid denatured PP | integral molding |
| Test Battery 23 | maleic acid denatured PP | maleic acid denatured PP | integral molding |
| Test Battery 24 | maleic acid denatured PP | polyethylene terephthalate | adhesive agent |

PP: polypropylene

TABLE 2

| | Material of Elastic Member on the Surface of Heater | Thickness of Elastic Member | Temperature when Sealant is Bonded | Pressure when Sealant is Bonded |
|---|---|---|---|---|
| Test Battery 1 | urethane rubber | 1 mm | 200° C. | 2 kg/cm$^2$ |
| Test Battery 2 | urethane rubber | 1 mm | 200° C. | 2 kg/cm$^2$ |
| Test Battery 3 | urethane rubber | 1 mm | 200° C. | 2 kg/cm$^2$ |
| Test Battery 4 | urethane rubber | 1 mm | 200° C. | 2 kg/cm$^2$ |
| Test Battery 5 | urethane rubber | 1 mm | 200° C. | 2 kg/cm$^2$ |
| Test Battery 6 | polytetrafluoroethylene | 1 mm | 200° C. | 2 kg/cm$^2$ |
| Test Battery 7 | polytetrafluoroethylene | 1 mm | 200° C. | 2 kg/cm$^2$ |
| Test Battery 8 | polytetrafluoroethylene | 1 mm | 200° C. | 2 kg/cm$^2$ |
| Test Battery 9 | urethane rubber | 1 mm | 200° C. | 2 kg/cm$^2$ |
| Test Battery 10 | silicon rubber | 1 mm | 200° C. | 2 kg/cm$^2$ |
| Test Battery 11 | polytetrafluoroethylene | 1 mm | 200° C. | 2 kg/cm$^2$ |
| Test Battery 12 | polyimide | 1 mm | 200° C. | 2 kg/cm$^2$ |
| Test Battery 13 | polyamide | 1 mm | 200° C. | 2 kg/cm$^2$ |
| Test Battery 14 | polyester | 1 mm | 200° C. | 2 kg/cm$^2$ |
| Test Battery 15 | polyester | 0.1 mm | 200° C. | 2 kg/cm$^2$ |
| Test Battery 16 | polyester | 20 mm | 200° C. | 2 kg/cm$^2$ |
| Test Battery 17 | polyester | 1 mm | 160° C. | 2 kg/cm$^2$ |
| Test Battery 18 | polyester | 1 mm | 300° C. | 2 kg/cm$^2$ |
| Test Battery 19 | polyester | 1 mm | 200° C. | 0.5 kg/cm$^2$ |
| Test Battery 20 | polyester | 1 mm | 200° C. | 10 kg/cm$^2$ |
| Test Battery 21 | not provided | — | 200° C. | 0.5 kg/cm$^2$ |
| Test Battery 22 | urethane rubber | 0.05 mm | 200° C. | 10 kg/cm$^2$ |
| Test Battery 23 | urethane rubber | 1 mm | 240° C. | 2 kg/cm$^2$ |
| Test Battery 24 | not provided | — | 200° C. | 0.5 kg/cm$^2$ |

The performance of each test battery was evaluated. The following items were evaluated.

1. A state of coating of the electrode terminal lead with the resin was confirmed.

2. The direction of burrs of the metal foil on the end surface of the laminate film was made to face the surface of the electrode terminal lead. The end surface was subjected to a heat welding process to determine whether or not short circuit occurred between the leads of the electrodes.

3. Each test battery was introduced into a constant temperature and humidity tank set to 60° C. and 90% RH. After a lapse of 72 hours, the moisture content was measured by a Karl Fischer's method.

4. Each test battery was introduced into a constant temperature and humidity tank set to 40° C. and 90% RH. Then, charge/discharge cycles were performed 200 times at the two-hour rate discharge (½ c) of the theoretical capacity. Thus, the retention ratio of the discharge capacity was measured.

Results were shown in Table 3.

TABLE 3

|  | Occurrence of Short Circuit | Breakage of Film | Quantity of Water Introduced (μg) | Retention Ratio of Capacity (%) |
|---|---|---|---|---|
| Test Battery 1 | 0/100 | not broken | 287 | 94 |
| Test Battery 2 | 0/100 | not broken | 295 | 93 |
| Test Battery 3 | 0/100 | not broken | 306 | 92 |
| Test Battery 4 | 0/100 | not broken | 299 | 93 |
| Test Battery 5 | 0/100 | not broken | 316 | 90 |
| Test Battery 6 | 0/100 | not broken | 325 | 91 |
| Test Battery 7 | 0/100 | not broken | 301 | 90 |
| Test Battery 8 | 0/100 | not broken | 294 | 90 |
| Test Battery 9 | 0/100 | not broken | 278 | 93 |
| Test Battery 10 | 0/100 | not broken | 316 | 94 |
| Test Battery 11 | 0/100 | not broken | 311 | 92 |
| Test Battery 12 | 0/100 | not broken | 302 | 92 |
| Test Battery 13 | 0/100 | not broken | 305 | 91 |
| Test Battery 14 | 0/100 | not broken | 284 | 93 |
| Test Battery 15 | 0/100 | not broken | 298 | 93 |
| Test Battery 16 | 0/100 | not broken | 300 | 91 |
| Test Battery 17 | 0/100 | not broken | 322 | 90 |
| Test Battery 18 | 0/100 | not broken | 312 | 93 |
| Test Battery 19 | 0/100 | not broken | 326 | 90 |
| Test Battery 20 | 0/100 | not broken | 292 | 90 |
| Test Battery 21 | 20/100 | broken | 548 | 62 |
| Test Battery 22 | 5/100 | broken | 526 | 67 |
| Test Battery 23 | 0/100 | not broken | 520 | 70 |
| Test Battery 24 | 7/100 | broken | 420 | 76 |

As can be understood from Table 3, provision of the elastic member for the surface of the heater enabled the heat welding process to be performed without occurrence of short circuit and breakage of the film. When the thickness of the elastic member was too small or if the pressure applied when the bonding process was too high (test battery 22), short circuit occurred frequently.

When different materials were combined with each other, the quantity of the moisture content was reduced as compared with the structure in which the sealant resin was formed into a single layer. Moreover, higher retention ratios of the capacities were realized.

EXPERIMENT 2

A laminate sheet having size 7 cm×14 cm and incorporating the heat weld resin which was non-oriented polypropylene having a thickness of 70 μm was folded back in the lengthwise direction such that the non-oriented polypropylene was positioned inwards. To form a 4 cm×4 cm sealing portion, the electrode terminals were taken from the interface of the heat welded portion of the laminate film to the outside. The heat welding resin (the sealant resin) was wound around a portion in which the terminal and the heat weld portion overlapped. Thus, the laminate sheet having a thickness of 100 μm, the terminal and the resin were simultaneously welded with heat.

At this time, the terminal was coated with an adhesive agent to bond the sealant resin. The sealing conditions were such that the temperature of the heater was set to make the temperature of the interface of the heat weld portion to be higher than the melting point by 10° C. The heaters disposed on the two sides were operated for 5 seconds. The pressure was 4 kgf/cm² which was higher than the pressure set when a usual sealing process was performed. The cut portion of the pack was sandwiched between the heaters. The occurrence of short circuit was determined as follows: a portion of the resin on the laminate sheet was separated to expose the metal film. Then, whether or not electrical conduction between the terminal and the metal film occurred was determined.

To evaluate the sealing performance, an electrolytic solution was injected into the container. The container was preserved at 70° C. and 90% RH. Thus, the quantity of enlargement of the moisture content was measured in ten days.

The structure of the sealant resin of each test battery was as follows.

Test Battery 25

Sealant resin had right and reverse sides each of which was constituted by bonding polyethylene having a melting point of 120° C. and an intermediate layer which was constituted by polyethylene terephthalate having a melting point of 260° C. The sealant resin having a thickness of 10 μm was protruded over the case by 100 μm.

Test Battery 26

Sealant resin had right and reverse sides each of which was constituted by bonding propylene having a melting point of 160° C. and an intermediate layer which was constituted by polyimide having a melting point of 700° C. The sealant resin having a thickness of 10 μm was protruded over the case by 100 μm.

Test Battery 27

Sealant resin had right and reverse sides each of which was constituted by bonding propylene having a melting point of 120° C. and an intermediate layer which was constituted by polyimide having a melting point of 700° C. The sealant resin having a thickness of 10 μm was protruded over the case by 100 μm.

Test Battery 28

Sealant resin had right and reverse sides each of which was constituted by bonding copolymer polypropylene having a melting point of 140° C. and an intermediate layer which was constituted by single-polymer polyethylene having a melting point of 162° C. The sealant resin having a thickness of 10 μm was protruded ver the case by 100 μm.

Test Battery 29

The thickness of the resin of the test battery 25 was 500 μm.

Test Battery 30

Sealant resin had right and reverse sides each of which was constituted by bonding copolymer polyethylene having a melting point of 100° C. and an intermediate layer which was constituted by single-polymer polyethylene having a melting point of 114° C. The sealant resin having a thickness of 10 μm was protruded over the case by 100 μm.

Test Battery 31

The thickness of the resin of the test battery 30 was 8 μm.

Test Battery 32

The thickness of the resin of the test battery 30 was 600 μm.

Test Battery 33

The resin of the test battery 30 was protruded by 80 μm.

Occurrence of short circuit of each test battery was shown in Table 4. The quantity the moisture content which had penetrated into each of the test batteries 25 and 32 was shown in Table 5.

TABLE 4

| | Occurrence of Short Circuit |
|---|---|
| Test Battery 25 | not occurred |
| Test Battery 26 | not occurred |
| Test Battery 27 | not occurred |
| Test Battery 28 | not occurred |
| Test Battery 29 | not occurred |
| Test Battery 30 | occurred |
| Test Battery 31 | occurred |
| Test Battery 32 | not occurred |
| Test Battery 33 | occurred |

TABLE 5

| | Quantity of Penetration of Moisture Content (ppm) |
|---|---|
| Test Battery 25 | 100 |
| Test Battery 32 | 600 |

In a case of the test battery 30 in which the difference in the melting point is small, also the resin having the higher melting point is softened and fluidized when the sealing process is performed. Thus, the coating is broken.

In a case of the test battery 31 in which the resin has a small thickness of 8 μm, the resin coating is broken when the sealing process is performed. Therefore, it is preferable that the thickness of the sealant resin is 10 μm or larger.

In a case of the test battery 32 in which the resin has a large thickness, occurrence of short circuit can effectively be prevented. However, the heat welding process using flat heaters suffers from unsatisfactory sealing performance. Therefore, the moisture content in an excessively large quantity was introduced in the measurement of the quantity of penetration of the moisture content, the result of which is shown in Table 5. When the moisture content in a quantity not smaller than 300 ppm is introduced into the battery, the battery deteriorates excessively. Therefore, it is preferable that the thickness of the sealant resin is 500 μm or smaller.

In a case of the test battery 33 in which the protrusion of the sealant resin is small such that the protrusion is shorter than the thickness of the case, the metal film at the cut portion of the case is brought into direct contact with the terminal. Thus, short circuit occurs.

On the other hand, the test batteries 25 to 29 set appropriately were free from occurrence of the short circuit and considerable penetration of the moisture content.

Although modifications and changes may be suggested by those skilled in the art, it is the intention of the inventors to embody within the patent warranted hereon all changes and modifications as reasonably and properly come within the scope of their contribution to the art.

The invention claimed is:

1. A nonaqueous-electrolyte battery comprising:
   a unit cell comprising a plurality of electrodes and a plurality of electrode terminal leads that are electrically connected to said respective electrodes and extend outwardly from said unit cell;
   a coating on said electrode terminal leads comprising an under layer and a sealant resin outer layer, said sealant resin outer layer being the product of a process comprising the steps of: (a) applying a resin layer to at least a portion of each of said electrical terminal leads along a periphery of each of said electrode terminal leads, and (b) contacting said resin layer with a heater head, said heater head comprising an elastic member; and
   a battery case substantially enclosing said unit cell therein, said battery case comprising a multi-layer film, said film comprising a case-protecting layer, an aluminum layer, and a heat weld layer,
   wherein,
      at least a portion of said sealant resin outer layer has an uneven shape;
      said heat weld layer substantially encloses said unit cell by contacting said sealant resin outer layer to substantially form a seal therebetween;
      at least a portion of each of said electrode terminal leads extends outwardly from said battery case;
      said sealant resin outer layer extends along each of said electrode terminal leads outwardly from said battery case to a distance, outside of said battery case, that is longer than the thickness of said battery case; and
      a ratio of the thickness of the sealant resin outer layer to a length that the sealant resin outer layer protrudes from the battery case is 1:10.

2. A nonaqueous-electrolyte battery according to claim 1 wherein said sealant resin comprises a single heat welding resin.

3. A nonaqueous-electrolyte battery according to claim 2 wherein said heat-welding resin is selected from the group consisting of at least one of polyolefin, ethylene-acrylate copolymer, ethylene-methacrylate copolymer, ionomer resin and carboxylic resin.

4. A nonaqueous-electrolyte battery according to claim 3 wherein said polyolefin is an acid denatured polyolefin.

5. A nonaqueous-electrolyte battery according to claim 1 wherein said sealant resin is a multilayer sealant resin that is formed by combining a heat welding resin and a resin that has a resin melting point which is higher than a heat welding resin melting point of said heat welding resin.

6. A nonaqueous-electrolyte battery according to claim 5 wherein said heat welding resin melting point and said resin melting point have a difference of 22° C. or greater.

7. A nonaqueous-electrolyte battery according to claim 5 wherein said heat welding resin is selected from the group consisting of at least one of polyolefin, ethylene-acrylate copolymer, ethylene-methacrylate copolymer, ionomer resin and carboxylic resin, and wherein said resin is selected from the group consisting of at least one of polyimide, polyamide, and polyester.

8. A nonaqueous-electrolyte battery according to claim 7 wherein said polyolefin is an acid denatured polyolefin.

9. A nonaqueous-electrolyte battery according to claim 5 wherein said sealant resin comprises a base material that includes a resin, said resin has a resin melting point that is higher than a heat welding resin melting point of said heat welding heat melting resin, said heat welting melting resin being formed on each of a first and second side of said base material.

10. A nonaqueous-electrolyte battery according to claim 5 wherein said heat welding resin is applied by coating.

11. A nonaqueous-electrolyte battery according to claim 1 wherein said sealant resin comprises a sealant resin thickness that ranges from 10 μm to 500 μm.

12. A nonaqueous-electrolyte battery according to claim 1 wherein said unit cell comprises at least one of a gel electrolyte and a solid electrolyte that each contain a matrix polymer and a lithium salt.

13. A nonaqueous-electrolyte battery according to claim 1 wherein said unit cell comprises a negative electrode that contains a negative electrode material so as to permit doping and dedoping of lithium.

14. A nonaqueous-electrolyte battery according to claim 13 wherein said negative electrode material comprises a carbon material.

15. A nonaqueous-electrolyte battery according to claim 1 wherein said unit cell comprises a positive electrode that contains a composite oxide of lithium and a transition metal.

16. A nonaqueous-electrolyte battery according to claim 1 wherein the terminal leads are exposed to the outside by 0.5 mm or longer.

17. nonaqueous-electrolyte battery comprising:
a unit cell comprising a plurality of electrodes and a plurality of electrode terminal leads that are electrically connected to said respective electrodes and extend outwardly from said unit cell;
a sealant resin coating applied to at least a portion of each of said electrode terminal leads along a periphery of each of said electrode terminal leads wherein said coating is the product of a process comprising:
applying resin to at least a portion of each of said electrode terminal leads along a periphery of each of said electrode terminal leads, and
contacting said resin layer with a heater head, said heater head comprising an elastic member; and
a battery case comprising a laminate film forming a laminate layer that encloses said unit cell by heat welding at least a portion of said laminate layer so as to form a heat weld layer, said heat weld layer sealingly enclosing said unit cell by contacting said sealant resin so as at least a portion of each of said electrode terminal leads extends outwardly from said heat weld layer,
wherein,
at least a portion of said sealant resin has an uneven shape;
said sealant resin extends along each of said electrode terminal leads outwardly from said battery case to a distance, outside of said battery case, that is longer than the thickness of said battery case; and
a ratio of the thickness of the sealant resin to a length that the sealant resin protrudes from the battery case is 1:10.

18. A nonaqueous-electrolyte battery according to claim 17 wherein said sealant resin comprises a single heat welding resin.

19. A nonaqueous-electrolyte battery according to claim 18 wherein said heat-welding resin is selected from the group consisting of at least one of polyolefin, ethylene-acrylate copolymer, ethylene-methacrylate copolymer, ionomer resin and carboxylic resin.

20. A nonaqueous-electrolyte battery according to claim 19 wherein said polyolefin is an acid denatured polyolefin.

21. A nonaqueous-electrolyte battery according to claim 17 wherein said sealant resin is a multilayer sealant resin that is formed by combining a heat welding resin and a resin that has a resin melting point which is higher than a heat welding resin melting point of said heat welding resin.

22. A nonaqueous-electrolyte battery according to claim 21 wherein said heat welding resin melting point and said resin melting point have a difference of 22° C. or greater.

23. A nonaqueous-electrolyte battery according to claim 21 wherein said heat welding resin is selected from the group consisting of at least one of polyolefin, ethylene-acrylate copolymer, ethylene-methacrylate copolymer, ionomer resin and carboxylic resin, and wherein said resin is selected from the group consisting of at least one of polyimide, polyamide, and polyester.

24. A nonaqueous-electrolyte battery according to claim 23 wherein said polyolefin is an acid denatured polyolefin.

25. A nonaqueous-electrolyte battery according to claim 21 wherein said sealant resin comprises a base material that includes a resin, said resin has a resin melting point that is higher than a heat welding melting resin melting point of said heat welding heat melting resin, said heat welting melting resin being formed on each of a first and second side of said base material.

26. A nonaqueous-electrolyte battery according to claim 21 wherein said heat welding resin is applied by coating.

27. A nonaqueous-electrolyte battery according to claim 17 wherein said sealant resin comprises a sealant resin thickness that ranges from 10 μm to 500 μm.

28. A nonaqueous-electrolyte battery according to claim 17 wherein said unit cell comprises at least one of a gel electrolyte and a solid electrolyte that each contain a matrix polymer and a lithium salt.

29. A nonaqueous-electrolyte battery according to claim 17 wherein said unit cell comprises a negative electrode that contains a negative electrode material so as to permit doping and dedoping of lithium.

30. A nonaqueous-electrolyte battery according to claim 29 wherein said negative electrode material comprises a carbon material.

31. A nonaqueous-electrolyte battery according to claim 17 wherein said unit cell comprises a positive electrode that contains a composite oxide of lithium and a transition metal.

* * * * *